May 19, 1953 M. GOLDBERG 2,639,073
MATTRESS FILLING MACHINE
Filed Oct. 21, 1950 5 Sheets-Sheet 5

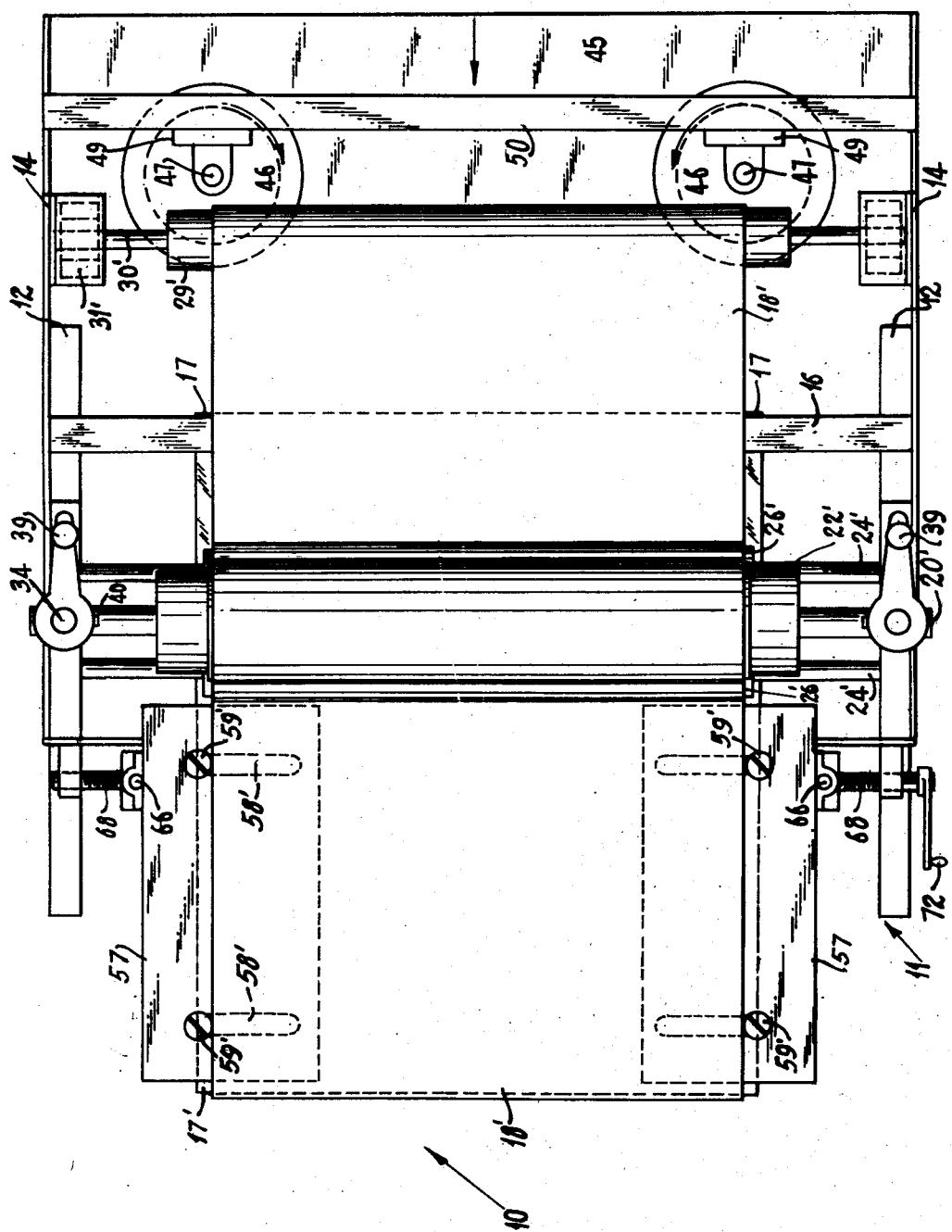

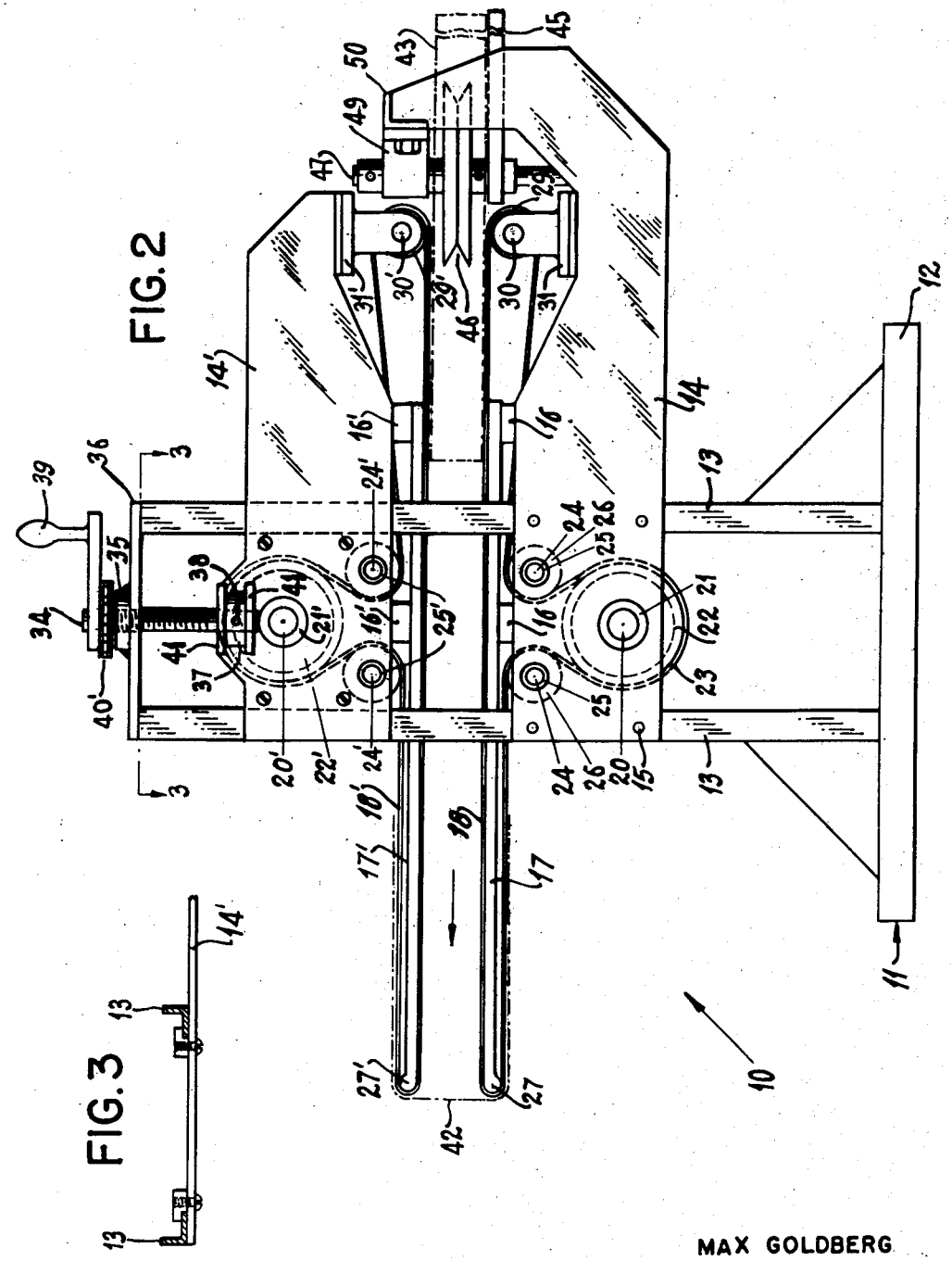

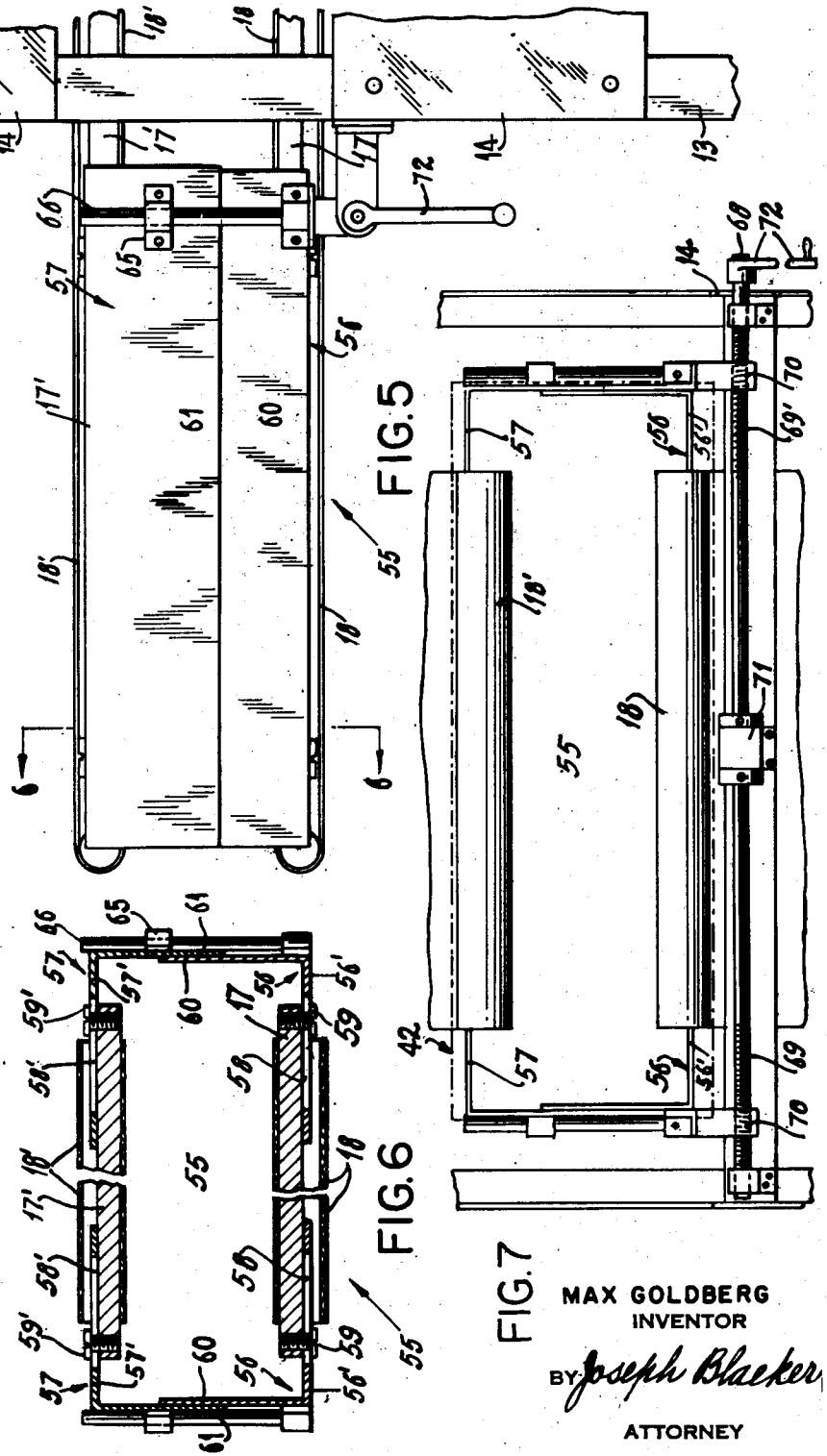

MAX GOLDBERG
INVENTOR

BY Joseph Blacker
ATTORNEY

Patented May 19, 1953

2,639,073

UNITED STATES PATENT OFFICE 2,639,073

MATTRESS FILLING MACHINE

Max Goldberg, New York, N. Y.

Application October 21, 1950, Serial No. 191,469

7 Claims. (Cl. 226—45)

This invention relates to a machine for filling mattress casings and pillow casings, etc., with pre-formed filler means made of foam rubber or the like.

An object of this invention is to provide an improved mattress filling machine which comprises a single endless belt supported on a platform at its upper elevation and passing around a large drive roller and around two lower tensioning rollers, one end of the endless belt passing around a roller having its upper surface in alignment with the platform while the other end of the endless belt passes around a curved end portion of a flat platform on which the belt is slidingly mounted, the said mechanism constituting the lower feeding member of the machine which is supported in fixed relation from a floor; in combination with an upper arrangement of similar but vertically movable mechanism constituting the upper feeding member but positioned in reversed relation to the said lower feeding member. The filler means which is generally made of foam rubber or the like is fed into a mattress casing supported by the upper and lower endless belts at the delivery end of the machine.

Another object of this invention is to provide vertically mounted endless belts intermediate the horizontal conveyors, at the feeding end of the machine, the vertical endless belts serving for compressing both side portions of a one-piece filler to cause the filler to freely enter into the mattress casing, the vertically mounted endless belts causing feeding actions on both sides of the filler and thereby augmenting the longitudinal feeding of the filler by the horizontal conveyors.

With the above and other objects in view, the invention will be hereinafter more particularly described, and the combination and arrangement of parts will be shown in the accompanying drawings and pointed out in the claims which form part of this specification.

Reference will now be had to the drawings, wherein like numerals of reference designate corresponding parts throughout the several views, in which:

Figure 1 is a top plan view of a machine embodying the invention.

Figure 2 is a side elevation of the machine shown in Figure 1.

Figure 3 is a cross-sectional view taken on line 3—3 in Figure 2.

Figure 5 is a fragmentary elevational side view of the machine, showing a modified discharge end portion having sideways movable members for filling mattress casings of large width.

Figure 6 is a cross-sectional view taken on line 6—6 in Figure 5.

Figure 7 is a front elevation of a fragmentary portion of the mattress filling machine showing an adjustable filler enclosure having a double threaded shaft arrangement for moving the upright sides of the enclosure to or from each other for different widths of fillers.

Figure 4:
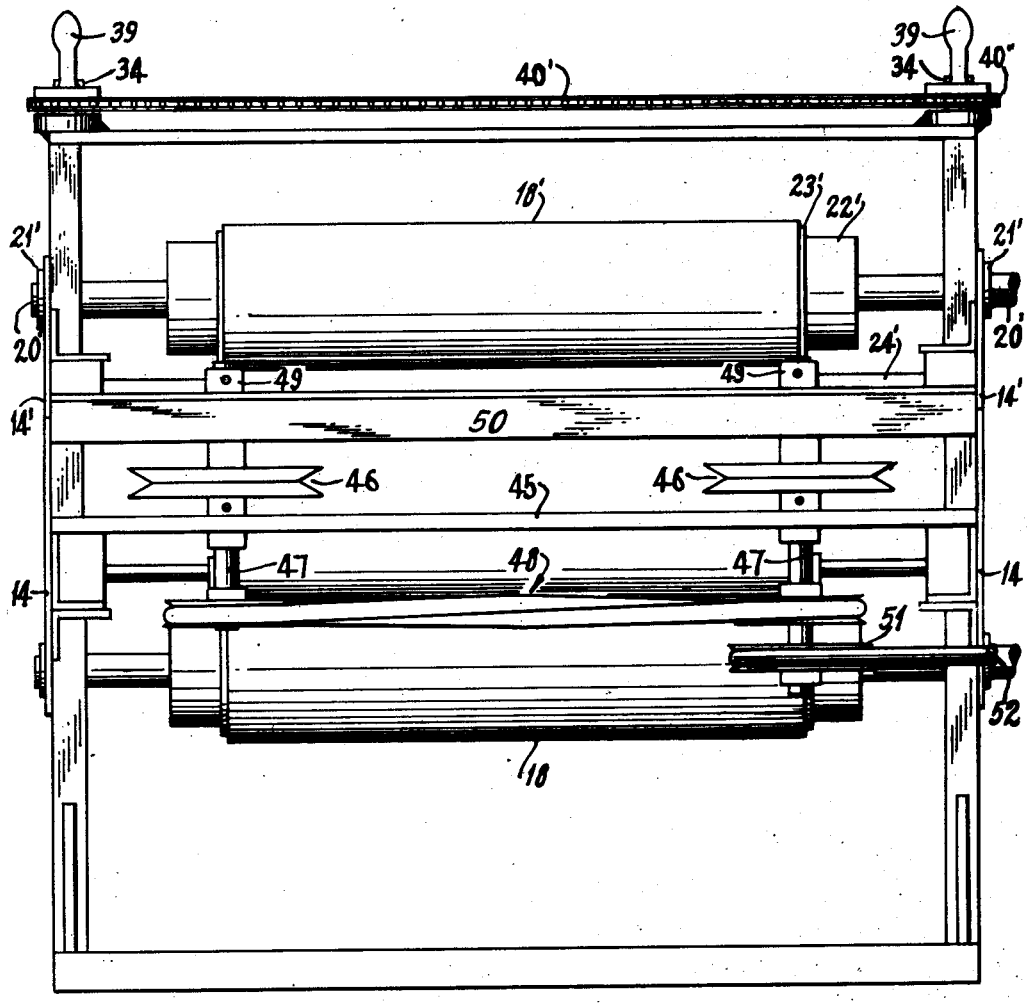
Figure 4 is a front end elevation of the machine.

In the illustrated embodiment of the invention, the numeral 10 indicates a mattress filling machine having a frame 11 comprising foundation members 12, uprights 13 and side plates 14 suitably fastened together by rivets 15.

Secured to the upper surfaces of the side plates 14 are transverse bars 16 to the upper surfaces of which a rectangular plate 17 is secured. The plate 17 forms a platform upon which a portion of an endless conveyor belt 18 is slidably mounted.

A shaft 20 is rotatably mounted in bearings 21 fixed to the plates 14. Secured to the shaft 20 is a roller 22 having a fluted rubber outer cover 23. Two shafts 24 are rotatably mounted in bearings 25 fixed to the plates 14. Each shaft 24 has a roller 26 suitably fixed thereto.

The rollers 26 are positioned closer together than the diameter of the fluted roller and serve to increase the arc of contact of the conveyor belt 18 with the roller 22.

At one end of the plate 17 is an integral extension 27 of generally circular cross-section. The extension 27 is coextensive with the transverse extent of the plate 17 and is large enough in diameter to extend appreciably below the plate and forms an end support over which the endless belt 18 is freely movable.

The support plate 17 terminates at the opposite end short of a roller 29 rotatably mounted on a shaft 30 disposed within bearings 31.

The endless conveyor belt 18 is rotatably mounted on the roller 29 while supported at its upper surface by the plate 17 and remains operative in a single horizontal plane in suitably elevated relation above the floor line.

Slidably mounted at the upper portion of the frame 11 are side plates 14' which carry transverse bars 16'. Secured to the lower surface of the transverse bars 16' is a rectangular plate 17'. A portion of the upper surface of the plate 17' forms a platform upon which a portion of an endless conveyor belt 18' is slidably mounted.

A shaft 20' is rotatably mounted in bearings 21' fixed to the plates 14'. Secured to the shaft 20' is a roller 22' having a fluted rubber outer casing 23'. Two shafts 24' are rotatably mounted in bearings 25' fixed to the plates 14'. Each shaft 24' has a roller 26' suitably fixed thereto.

The rollers 26' are positioned closer together than the diameter of the fluted roller 22' and serve to increase the arc of contact of the conveyor belt 18' with the roller 22'.

At one end of each plate 17' is an integral extension 27' of generally circular cross-section. The extension 27' is coextensive with the transverse extent of the plate 17' and is large enough in diameter to extend appreciably above the plate 17' and forms an end support over which the endless belt 18' is freely movable.

The support plate 17' terminates at the opposite end short of a roller 29' rotatably mounted on a shaft 30' disposed within bearings 31'.

The endless conveyor belt 18' is rotatably mounted on the roller 29' while slidably supported at its lower surface by the plate 17' and is movable vertically up and down in relation to the belt 18. This vertical motion is accomplished by threaded members 34 threadably mounted in threaded bosses 35 secured to the upper face of a plate 36 fixed to the uprights 13. At its lower end, each threaded member 34 is fixed to a collar 37 by a pin 38. At its upper end, each threaded member 34 is fixed to a lever 39 by a pin 40. The collar 37 is mounted between ears 41 integral with and extending from the plate 14'. A chain 40'' meshing with sprockets 40'' rotatably connects the elevating screw shafts 34.

By manipulating either lever 39, it is possible to raise or lower the conveyor belt 18' and the supporting mechanism therefor to and from the conveyor belt 18. This arrangement makes it possible to adjust the distance between the two conveyor belts 18 and 18', so that the mattress casings or tickings 42 of different heights may be mounted in frictionally supported relation on the feeding end portions of the conveyor belts 18 and 18'.

It is to be noted that the mechanism so far described serves for the purpose of inserting a foam rubber filler 43 which is preferably made in one piece in its entirety, into a casing or ticking 42. A single filler of extensive size is designed to occupy and fill the entire mattress casing. In operation, the filler 43 is compressed when inserted between the sheave rollers 29 and 29', and between the endless conveyor belts 18 and 18' and freely fed into the casing 42.

A table 45 supported on the fixed side plates 14, supports the mattress filler 43 between the upper and lower endless conveyor belts 18 and 18'.

The one-piece type foam rubber filler 43 is highly compressible and must also be compressed sideways to permit its ready insertion into a mattress casing or ticking 42. For this purpose, I provide two pulleys 46 preferably of sheave type and mounted on vertical shafts 47 to rotate horizontally intermediate the conveyors. As shown by the arrows in Figure 1, the pulleys 46 rotate toward each other due to a crossed belt and pulley arrangement 48 below the table 45. The pulleys 46 can frictionally grip and compress both sides of a single unit foam rubber filler 43 to a width considerably less than the width of a mattress casing so as to freely enter into the casing.

As shown in Figures 2 and 4, it will be seen that a portion of each of the sheave pulleys 46 are in overlapping relation with an end portion of the upper and lower horizontal conveyor belts 18 and 18'. The pulleys 46 are thereby adapted for compressing both side portions of a unitary filler. It will be noted that the upper and lower conveyors simultaneously compress the foam rubber filler 43 which has been reduced in width by the sheave pulleys. The compressive force exerted by the conveyor belts holds the sideways compressed filler to its smaller width while passing through the machine and this compression causes the filler to freely enter the mattress casing and then expand to the required size.

The shafts 47 are rotatably supported in bearing apertures in the table 45 and in bearings 49 suitably secured to the rear face of a cross beam 50 which is fixed to the side walls 14. A pulley 51 on the right-hand shaft 47 is driven by a belt 52 and imparts rotary motion to the pulleys 46.

Figure 5 shows a side view and Figure 6 shows a cross-sectional view of a modified vertically and horizontally adjustable discharge portion 55 of the mattress filling machine 10. The adjustable discharge portion 55 is made of two lower right-angular plate members 56 respectively secured to the lower face of the fixed support plate 17, and two upper right-angular plate members 57 secured to the upper face of the vertically movable plate 17'.

The horizontal side 56' of each member 56 has narrow transverse slots 58 through which the body portions of screws 59 pass into threaded engagement with the platform 17. The screw and slot arrangement serve to support the members 56 in frictionally slidable relation crosswise of the platform 17.

The horizontal side 57' of each member 57 has narrow transverse slots 58' through which the body portions of screws 59' pass into threaded engagement with the platform 17'. The members 57 are thus frictionally slidable crosswise of the platform 17', similar to the members 56.

Each member 56 has a vertical wall 60. Each member 57 has a vertical wall 61. The walls 60 and 61 are in slidable telescopic relation and jointly with the upper and lower faces of the conveyors form a full rectangular enclosure of the adjustable discharge portion 55.

A bearing 65 is suitably fixed to the wall 61. A vertical rod 66 is fixed to the wall 60 and is slidable through the bearing 65.

The rod 66 provides an interlock which causes both walls 60 and 61 to move as a unit when one of the walls is moved laterally of the plates 17 and 17'.

When the operator turns a lever or handle 39 to raise or lower the platform 17', the upright wall 61 is at the same time raised or lowered and this adjusts the vertical distance inside the rectangular enclosure or discharge portion 55.

For the purpose of moving the members 56 to or from each other, I provide a shaft 68 having threads 69, 69' on opposite ends which rotate in opposite directions. The shaft 68 is rotatably mounted in bearings 70 secured to the horizontal sides 56' of the members 56. The shaft 68 has a middle bearing 71 which is designed to retain the shaft in rotatable relation but not movable sideways from the bearings 70. The handle 72 attached to one end of the shaft 68 serves to rotate the shaft. Bearings 70' support the shaft 68.

It will thus be seen that when the shaft 68 is rotated, the oppositely directed threads 69, 69' will cause the bearings 65 and the plates 61 jointly with the plates 60 to move to or from the middle of the discharge portion 55. It will be noted that by manipulating the handles 72 and 39, it is possible to provide an enclosure 55 of desired height and of desired width suitable for a particular size mattress casing.

Figure 8:
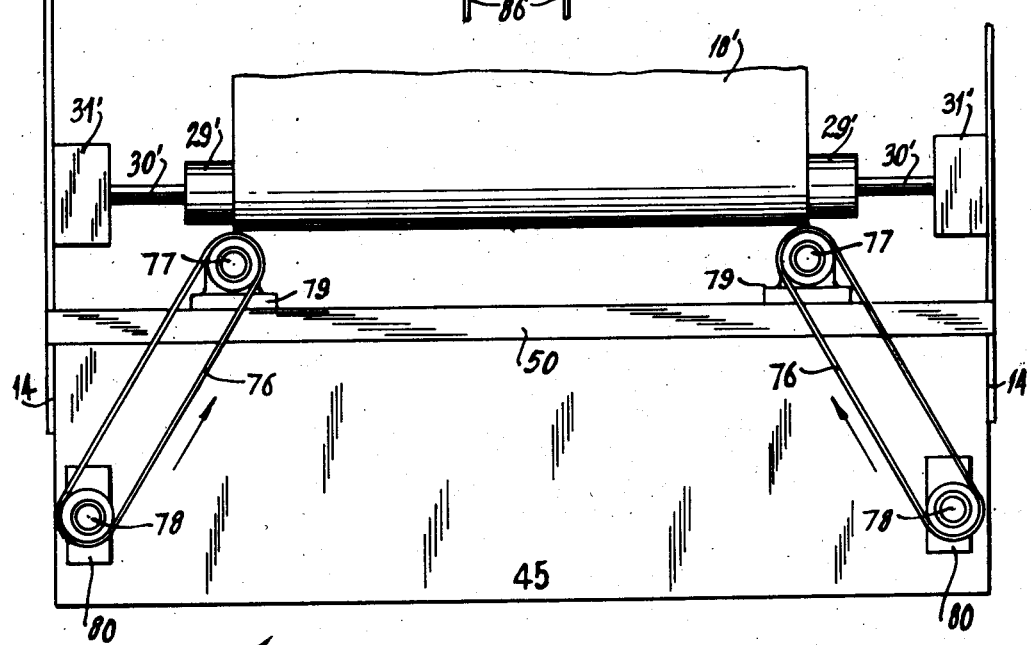
Figure 8 is a top plan view of a modified mechanism for feeding both sides of a mattress filler by means of endless belts.

As shown in Figure 8, I have provided a modified side feed 75 comprising two vertical rotatable endless belts 76 each mounted on two shafts 77 and 78. The shafts 77 are rotatably mounted in bearings 79 fixed rearwardly of the cross beam 50 which is integral with the side plates 14. The shafts 78 are mounted in bearing blocks 80 on the table 45 and suitably held in position.

The belts 76 are arranged to face each other in angular relation, with the vertex of the angle facing the discharge end of the machine. The endless belts 76 cause feeding action on both upright sides of the filler 43 and thereby augment the longitudinal feeding of the mattress filler by the horizontal conveyor belts 18 and 18'.

Figure 9:
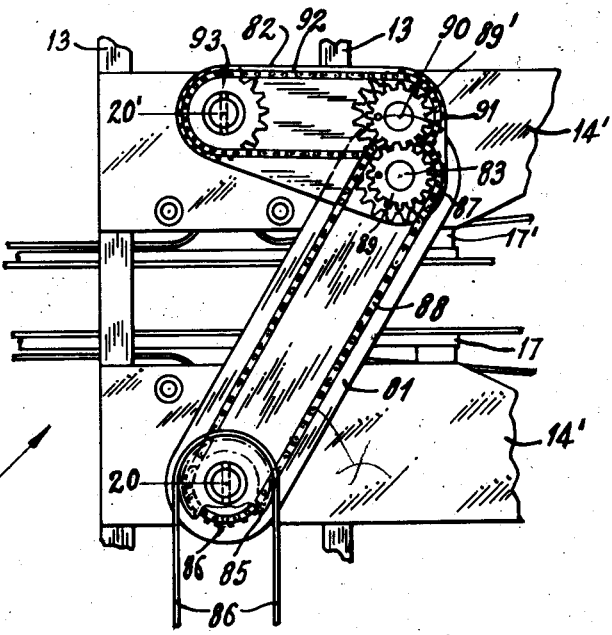
Figure 9 is a front view of the drive mechanism.

Figure 9 is a front view of a drive mechanism 80 for driving the lower shaft 20 and the vertically movable upper shaft 20' in varied positions of relative adjustment. The mechanism 80 comprises a plate 81 in which the shaft 20 is rotatably mounted and a plate 82 in which the shaft 20' is rotatably mounted. A shaft 83 is rotatably mounted in the plates 81 and 82 and provides a pivot about which the said plates may swing when the shaft 20' is moved vertically.

The shaft 20 has a pulley 85 fixed thereto and is driven by a belt 86 suitably connected to a source of power (not shown).

Between the pulley 85 and the plate 81 is a sprocket gear 86 secured to the shaft 20. A sprocket gear 87 is rotatably mounted on the shaft 83. The sprocket gear 86 and 87 are connected by a sprocket chain 88.

A spur gear 89 is rotatably mounted on the shaft 83 and secured to the sprocket gear 87. The spur gear 89 is in mesh with a spur gear 89' rotatably mounted on stub shaft 90. The shaft 90 is secured to the plate 82 while the shaft 83 passes through the plate 82 and is secured to the plate 81. A further sprocket gear 91 is rotatably mounted on the shaft 90 and is secured to the spur gear 89'. The sprocket gear 91 is driven by a sprocket chain 92 which meshes with a sprocket gear 93 secured to the shaft 20'.

It will be seen that the belt 86 will drive both shafts 20 and 20' irrespective of the vertical distance of the shaft 20' in relation to the shaft 20 due to the permissible angular variations between the plates 81 and 82 swinging on the shaft or common pivot 83.

In accordance with the patent statutes I have described and illustrated the preferred embodiment of my invention, but it will be understood that various changes and modifications can be made therein without departing from the spirit of the invention as defined by the appended claims.

I claim:

1. In a filling machine for filling a mattress casing with a unitary foam rubber filler, the combination of a frame and means for supporting said unitary filler, upper and lower longitudinally endless substantially parallel conveyors made of fabric and forming a spout, said conveyors being adapted to compress said filler and thereby exert longitudinal feeding actions on the upper and lower faces of said filler, and two sheave pulleys rotatably mounted horizontally intermediate said conveyors, at the feeding end of said machine, a portion of each of said sheave pulleys being in overlapping relation with an end portion of said conveyors and being thereby adapted for compressing both side portions of said unitary filler prior to the initiation of compression by said conveyors, said reduced width and bodily compressed filler being thereby adapted to freely enter into said mattress casing, said pulleys causing feeding actions on both sides of said filler and thereby augmenting the longitudinal feeding of said filler by said conveyors, said upper conveyor being vertically movably mounted relative to said lower conveyor for filling mattress casings of different thicknesses.

2. In a filling machine for filling a mattress casing with a unitary foam rubber filler, the combination of a frame and means for supporting said unitary filler, upper and lower longitudinally endless substantially parallel conveyors made of fabric and forming a spout, said conveyors being adapted to compress said filler and thereby exert longitudinal feeding actions on the upper and lower faces of said filler, and two sheave pulleys rotatably mounted horizontally intermediate said conveyors, at the feeding end of said machine, a portion of each of said sheave pulleys being in overlapping relation with an end portion of said conveyors and being thereby adapted for compressing both side portions of said unitary filler prior to the initiation of compression by said conveyors, said reduced width and bodily compressed filler being thereby adapted to freely enter into said mattress casing, said pulleys causing feeding actions on both sides of said filler and thereby augmenting the longitudinal feeding of said filler by said conveyors.

3. In a filling machine for filling a mattress casing with foam rubber filler means, the combination of a frame and means for supporting said filler means, upper and lower longitudinally endless substantially parallel conveyors and forming a spout, said conveyors being adapted to compress said filler means and thereby exert longitudinal feeding actions on the upper and lower faces of said filler means, and two rotary compressing means mounted horizontally intermediate said conveyors, at the feeding end of said machine, a portion of each of said rotary compressing means being in overlapping relation with an end portion of said conveyors and being thereby adapted for compressing both side portions of said filler means prior to the initiation of compression by said conveyors, said reduced width and bodily compressed filler being thereby adapted to freely enter into said mattress casing, said rotary compressing means causing feeding actions on both sides of said filler means and thereby augmenting the longitudinal feeding of said filler means by said conveyors.

4. In a filling machine for filling a mattress casing with foam rubber filler means, the combination of a frame and means for supporting said filler means, upper and lower longitudinally endless substantially parallel horizontal conveyors and forming a spout, said horizontal conveyors being adapted to compress said filler means and thereby exert longitudinal feeding actions on the upper and lower faces of said filler means, and two vertically mounted rotary compressing means intermediate said horizontal conveyors, at the feeding end of said machine, a portion of each of said rotary compressing means being in overlapping relation with an end portion of said conveyors and being thereby adapted for compressing both side portions of said filler means prior to the initiation of compression by said conveyors, said reduced width and bodily compressed filler being thereby adapted to freely enter into said mattress casing, said vertically mounted rotary compressing means causing feeding actions on both sides of said filler means and thereby augmenting the longitudinal feeding of said filler means by said horizontal conveyors.

5. In a filling machine for filling a mattress casing with a foam rubber filler, the combination of a frame and means for supporting said filler, upper and lower longitudinally endless substantially parallel horizontal conveyors forming a spout, said horizontal conveyors being adapted to compress said filler and thereby exert longitudinal feeding actions on the upper and lower faces of said filler, and two vertically mounted rotary compressing means intermediate said horizontal conveyors, at the feeding end of said machine, a portion of each of said rotary compressing means being in overlapping relation with an end portion of said conveyors and being thereby adapted for compressing both side portions of said filler prior to the initiation of compression by said conveyors, said reduced width and bodily compressed filler being thereby adapted to freely enter into said mattress casing, said vertically mounted rotary compressing means causing feeding actions on both sides of said filler and thereby augmenting the longitudinal feeding of said filler by said horizontal conveyors.

6. In a filling machine for filling a mattress casing with a foam rubber filler, the combination of a frame and means for supporting said filler, upper and lower longitudinally endless substantially parallel horizontal conveyors forming a spout, fixed horizontal platforms supporting said conveyors, said horizontal conveyors being adapted to compress said filler and thereby exert longitudinal feeding actions on the upper and lower faces of said filler, two vertically mounted rotary compressing means intermediate said horizontal conveyors, at the feeding end of said machine, a portion of each of said rotary compressing means being in overlapping relation with an end portion of said conveyors and being thereby adapted for compressing both side portions of said filler prior to the initiation of compression by said conveyors, said reduced width and bodily compressed filler being thereby adapted to freely enter into said mattress casing, said vertically mounted rotary compressing means causing feeding actions on both sides of said filler and thereby augmenting the longitudinal feeding of said filler by said horizontal conveyors, and a telescopic rectangular enclosure integral with said platforms and adjustable for delivering a filler of pre-determined size into said mattress casing.

7. In a filling machine for filling a mattress casing with a foam rubber filler, the combination of a frame and means for supporting said filler, upper and lower longitudinally endless substantially parallel horizontal conveyors forming a spout, fixed horizontal platforms supporting said conveyors, said horizontal conveyors being adapted to compress said filler and thereby exert longitudinal feeding actions on the upper and lower faces of said filler, two vertically mounted rotary compressing means intermediate said horizontal conveyors, at the feeding end of said machine, a portion of each of said rotary compressing means being in overlapping relation with an end portion of said conveyors and being thereby adapted for compressing both side portions of said filler prior to the initiation of compression by said conveyors, said reduced width and bodily compressed filler being thereby adapted to freely enter into said mattress casing, a telescopic rectangular enclosure integral with said platforms and adjustable for delivering a filler of pre-determined size into said mattress casing, and means for driving said upper and lower conveyor belts irrespective of the vertical distance of said upper conveyor belt from said lower conveyor belt.

MAX GOLDBERG.

References Cited in the file of this patent

UNITED STATES PATENTS

| Number | Name | Date |
| --- | --- | --- |
| 568,648 | White | Sept. 29, 1896 |
| 771,073 | Johansen | Sept. 27, 1904 |
| 2,110,359 | Droll et al. | Mar. 8, 1938 |
| 2,372,646 | Barnby et al. | Apr. 3, 1945 |
| 2,509,771 | Lang | May 30, 1950 |